US010926775B2

(12) United States Patent
Suzuki

(10) Patent No.: US 10,926,775 B2
(45) Date of Patent: Feb. 23, 2021

(54) DRIVING EVALUATION SYSTEM, DRIVING EVALUATION METHOD, PROGRAM, AND MEDIUM

(71) Applicant: HONDA MOTOR CO., LTD., Tokyo (JP)

(72) Inventor: Hideyuki Suzuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/524,535

(22) Filed: Jul. 29, 2019

(65) Prior Publication Data

US 2020/0031359 A1  Jan. 30, 2020

(30) Foreign Application Priority Data

Jul. 30, 2018 (JP) ............................. JP2018-142090

(51) Int. Cl.
*B60W 40/09* (2012.01)
*G06K 9/00* (2006.01)

(52) U.S. Cl.
CPC ......... *B60W 40/09* (2013.01); *G06K 9/00845* (2013.01); *B60W 2520/105* (2013.01); *B60W 2520/125* (2013.01)

(58) Field of Classification Search
CPC ..... B60W 2520/105; B60W 2520/125; B60W 40/09; G06K 9/00845
See application file for complete search history.

(56) References Cited

U.S. PATENT DOCUMENTS

| 2009/0030574 | A1* | 1/2009 | Yamakado | ............... B62D 6/00 701/44 |
| 2014/0129090 | A1* | 5/2014 | Yamakado | ............ B60W 50/16 701/41 |
| 2019/0023279 | A1 | 1/2019 | Schacher | |

FOREIGN PATENT DOCUMENTS

| DE | 102017212355 A1 | 1/2019 |
| JP | 2014-80087 A | 5/2014 |

OTHER PUBLICATIONS

Search report dated May 31, 2020, issued in counterpart DE Application No. DE102019211087.8, with English Translation. (14 pages).

* cited by examiner

*Primary Examiner* — Sisay Yacob
(74) *Attorney, Agent, or Firm* — Westerman, Hattori, Daniels & Adrian, LLP

(57) ABSTRACT

A driving evaluation system evaluates driving skills of a vehicle by a driver, and includes an in-turn data acquisition unit that acquires in-turn data including time series data of longitudinal acceleration and lateral acceleration in a turning scene; and a turning scene evaluation unit that evaluates driving skills in the turning scene on the basis of a shape of a trajectory of time series data from a starting point at which the longitudinal acceleration becomes a maximum to an ending point at which an absolute value of the lateral acceleration becomes a maximum, among the in-turn data in a case in which the longitudinal acceleration upon deceleration is positive.

18 Claims, 12 Drawing Sheets

FIG. 4

| | | | |
|---|---|---|---|
| DECELERATION SCENE | DRIVING EVALUATION VALUE<br>10-POINT RANKING SYSTEM<br>(MAXIMUM 10) | BASIC EVALUATION VALUE<br>ACCELERATION CONTINUITY<br>10-POINT RANKING SYSTEM<br>(MAXIMUM 10) | FIRST DEMERIT POINT<br>EVALUATION VALUE<br>DECELERATION STABILITY<br>DEMERIT POINT SYSTEM<br>(MAXIMUM 0) | SECOND DEMERIT POINT<br>EVALUATION VALUE<br>LATERAL ACCELERATION<br>EFFICIENCY<br>DEMERIT POINT SYSTEM<br>(MAXIMUM 0) |
| ACCELERATION SCENE | PD | - | - | - |
| TURNING SCENE | PA | - | - | - |
| | PT=PTb+PTd2+PTd2 | PTb | PTd1 | PTd2 |

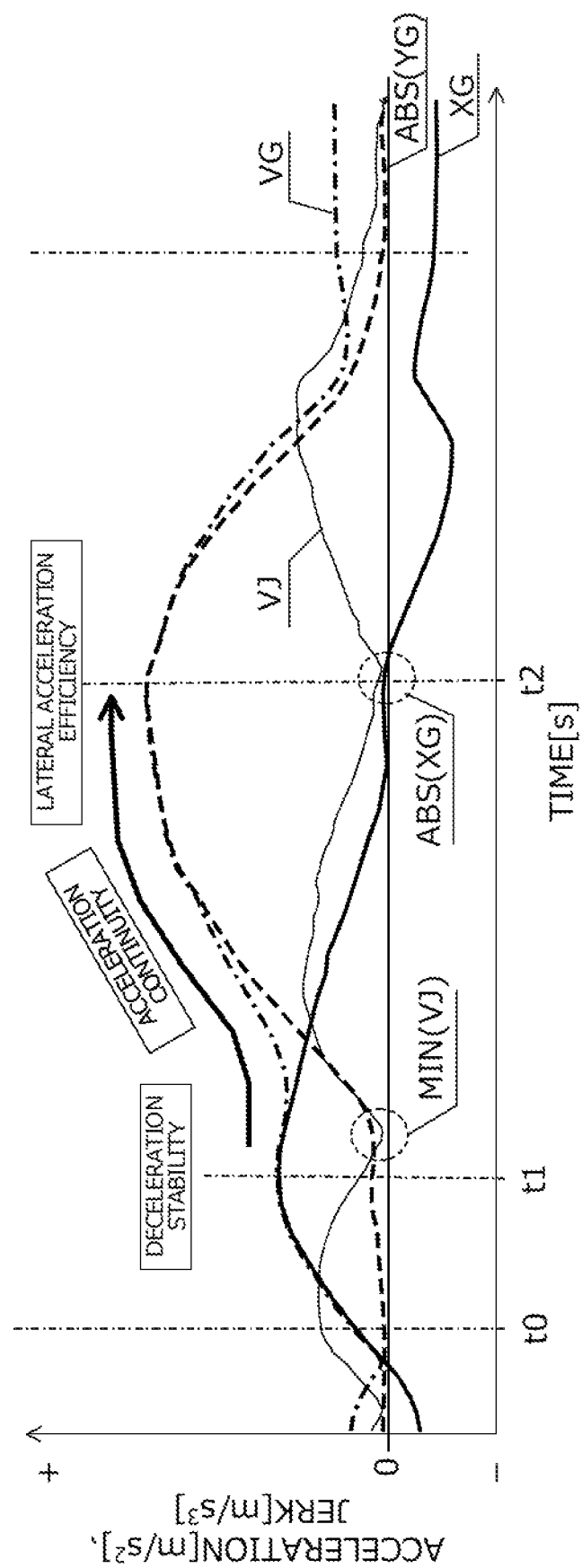

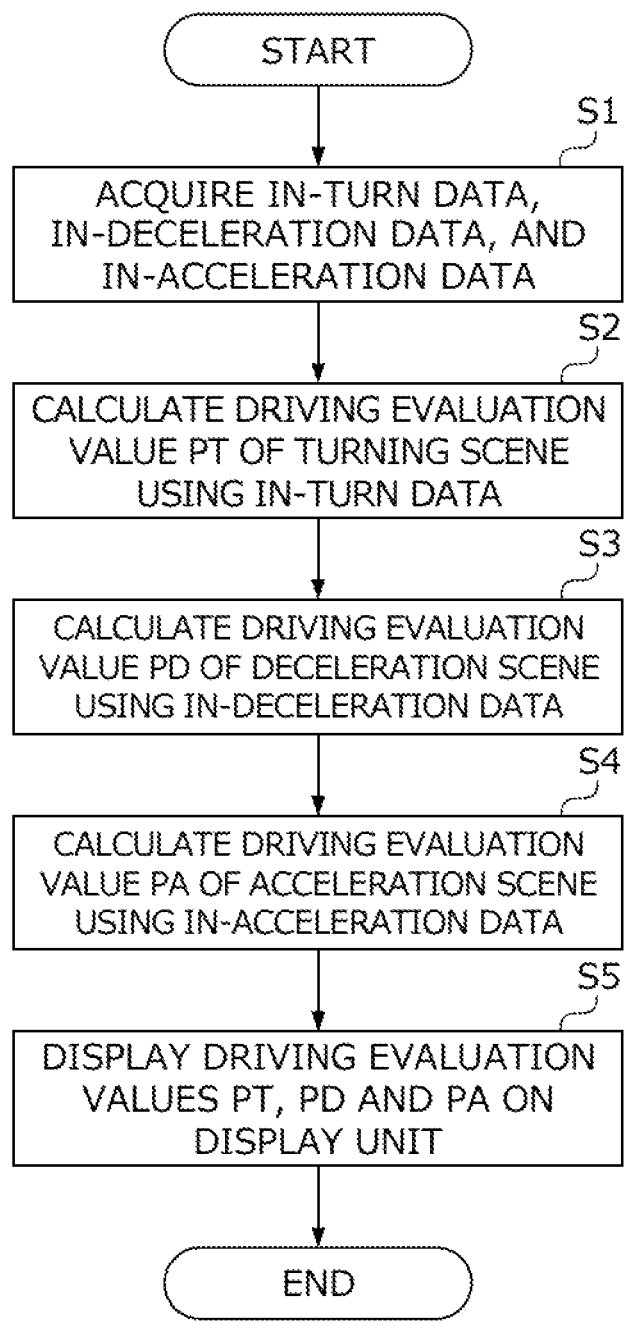

DRIVING EVALUATION SYSTEM, DRIVING EVALUATION METHOD, PROGRAM, AND MEDIUM

This application is based on and claims the benefit of priority from Japanese Patent Application No. 2018-142090, filed on 30 Jul. 2018, the content of which is incorporated herein by reference.

BACKGROUND OF THE INVENTION

Field of the Invention

The present invention relates to a driving evaluation system that evaluates driving skills of a vehicle by a driver, a driving evaluation method, a program, and a medium.

Related Art

Japanese Unexamined Patent Application, Publication No. 2014-80087 discloses a driving evaluation system that evaluates driving skills of a vehicle by a driver in real time. In the driving evaluation system of Japanese Unexamined Patent Application, Publication No. 2014-80087, the driving skills of a vehicle by a driver are evaluated in real time on the basis of the comparison with a threshold that is set on the basis of a vehicle speed and a synthetic acceleration made by synthesizing longitudinal acceleration and lateral acceleration of the vehicle.

SUMMARY OF THE INVENTION

Incidentally, during turning of a vehicle, it is necessary for a driver to perform complicated manipulations using the brake pedal, steering, accelerator pedal, etc. In other words, in order to turn the vehicle smoothly, it is necessary for the driver to depress the brake pedal and the accelerator pedal at appropriate timings with the appropriate intensity, and furthermore, it is necessary for the driver to manipulate the steering at the appropriate timing with the appropriate angle. Therefore, a great difference in the driving skills is likely to be shown in particular during turning of the vehicle. However, in the driving evaluation system of Japanese Unexamined Patent Application, Publication No. 2014-80087, the driving skills are evaluated on the basis of the comparison between a threshold and a vector calculated by simply synthesizing the longitudinal acceleration and the lateral acceleration. Therefore, it is difficult to appropriately evaluate the driving skills during turning.

It is an object for the present invention to provide a driving evaluation system that makes it possible to appropriately evaluate driving skills during turning of a vehicle, a driving evaluation method, a program, and a medium.

According to a first aspect of the present invention, a driving evaluation system (for example, a driving evaluation system 1 as described later) evaluates driving skills of a vehicle by a driver and includes: an in-turn data acquisition unit (for example, an in-turn data acquisition unit 51b) configured to acquire in-turn data including time series data of longitudinal acceleration and lateral acceleration in a turning scene; and a turning scene evaluation unit (for example, a turning scene evaluation unit 53 as described later) configured to evaluate driving skills in the turning scene on the basis of a shape of a trajectory of time series data from a starting point at which the longitudinal acceleration becomes a maximum to an ending point at which an absolute value of the lateral acceleration becomes a maximum, among the in-turn data in a case in which the longitudinal acceleration upon deceleration is positive.

According to a second aspect of the present invention, it is preferable that the turning scene evaluation unit includes: a first evaluation value calculation unit (for example, a basic evaluation value calculation unit 53a as described later) that calculates a first evaluation value on the basis of the shape of the trajectory of the time series data from the starting point to the ending point; a second evaluation value calculation unit (for example, a first demerit point evaluation value calculation unit 53b as described later) that calculates, on the basis of the in-turn data, time series data of a jerk vector having longitudinal jerk and lateral jerk as components, and calculates a second evaluation value on the basis of a minimum value of the jerk vector; a third evaluation value calculation unit (for example, a second demerit point evaluation value calculation unit 53c as described later) that calculates a third evaluation value on the basis of the absolute value of the longitudinal acceleration at the ending point; and a comprehensive evaluation value calculation unit (for example, a comprehensive evaluation value calculation unit 53d as described later) that calculates a comprehensive evaluation value in which the driving skills in the turning scene is quantified, by summing the first evaluation value, the second evaluation value, and the third evaluation value.

According to a third aspect of the invention, it is preferable that the first evaluation value calculation unit sets the first evaluation value to a larger value as the shape of the trajectory of the time series data from the starting point to the ending point approaches a shape of a predetermined reference trajectory, the second evaluation value calculation unit sets the second evaluation value to a smaller value as a minimum value of the jerk vector deviates from 0, and the third evaluation value calculation unit sets the third evaluation value to a smaller value as the absolute value deviates from 0.

According to a fourth aspect of the present invention, it is preferable that the reference trajectory is an elliptic arc having the starting point as an intersection point with any one of a major axis and a minor axis and the ending point as an intersection point with the other axis.

According to a fifth aspect of the present invention, it is preferable that the turning scene is a section in which magnitude of an acceleration vector having longitudinal acceleration and lateral acceleration as components is equal to or more than a predetermined value continues over a predetermined period of time, and a maximum value of an absolute value of the lateral acceleration is equal to or more than a predetermined value.

According to a sixth aspect of the present invention, it is preferable that the predetermined period of time is equal to or more than five seconds and within fifteen seconds.

According to a seventh aspect of the present invention, it is preferable that the driving evaluation system further includes: an in-acceleration and in-deceleration data acquisition unit (for example, an in-deceleration data acquisition unit 51c and an in-acceleration data acquisition unit 51d as described later) that is configured to acquire in-acceleration and in-deceleration data including time series data of longitudinal acceleration and lateral acceleration in an acceleration-deceleration scene; and an acceleration-deceleration scene evaluation unit (for example, a deceleration scene evaluation unit 54 and an acceleration scene evaluation unit 55 as described later) that evaluates driving skills in the acceleration-deceleration scene, in which the acceleration-deceleration scene evaluation unit evaluates the driving skills in the acceleration-deceleration scene on the basis of a ratio of an acceleration vector value having the longitudinal jerk and the lateral jerk as components relative to a maximum value of the acceleration vector in the acceleration-deceleration scene, or a ratio of a jerk vector value having the longitudinal acceleration and the lateral acceleration as components relative to a maximum value of the jerk vector in the acceleration-deceleration scene.

According to an eighth aspect of the present invention, a driving evaluation method is a method performed by the driving evaluation system according to the first aspect, and includes the steps of: acquiring in-turn data including time series data of longitudinal acceleration and lateral acceleration in a turning scene by way of the in-turn data acquisition unit; and evaluating, by way of the turning scene evaluation unit, driving skills in the turning scene on the basis of a shape of a trajectory of time series data from a starting point at which the longitudinal acceleration becomes a maximum to an ending point at which an absolute value of the lateral acceleration becomes a maximum, among the in-turn data, in a case in which the longitudinal acceleration upon deceleration is positive.

According to a ninth aspect of the present invention, a program according to the present invention is a program for causing a computer (for example, an ECU 5 or a smartphone, as described later) to execute each step of the driving evaluation method according to the eighth aspect.

According to a tenth aspect of the present invention, a medium according to the present invention is a medium encoded with the program according to the ninth aspect.

According to the first aspect of the present invention, generally speaking, during turning of a vehicle, the driver first depresses the brake pedal to decelerate the vehicle, starts a steering manipulation near the period of time at which the longitudinal acceleration becomes a maximum to thereby turn the vehicle, and then starts depressing the accelerator pedal near the period of time at which an absolute value of the lateral acceleration becomes a maximum to thereby accelerate the vehicle. As described later with reference to FIGS. 8A and 8B, when plotting the trajectories of the longitudinal acceleration and the lateral acceleration upon turning on a two-dimensional plane, the trajectories from the period of time at which the longitudinal acceleration becomes a maximum to the period of time at which the lateral acceleration becomes a maximum differ significantly between an expert driver having high driving skills and a normal driver having low driving skills. Therefore, in the driving evaluation system of the present invention, an in-turn data acquisition unit acquires in-turn data including time series data of longitudinal acceleration and lateral acceleration in a turning scene, and a turning scene evaluation unit evaluates driving skills in the turning scene on the basis of a shape of a trajectory of time series data from a starting point at which the longitudinal acceleration becomes a maximum to an ending point at which an absolute value of the lateral acceleration becomes a maximum, among the in-turn data. This makes it possible to appropriately evaluate a driver's driving skills during turning of a vehicle, according to the driving evaluation system.

With the driving evaluation system of the second aspect of the present invention, the first to third evaluation values calculated by the first to third evaluation value calculation units are summed, whereby a comprehensive evaluation value in which the driving skills in the turning scene is quantified is calculated. The first evaluation value calculation unit calculates the first evaluation value on the basis of the shape of a trajectory of time series data from a starting point to an ending point. This makes it possible to evaluate acceleration continuity between deceleration to acceleration upon turning through the first evaluation value, according to the present invention. The second evaluation value calculation unit calculates the second evaluation value on the basis of a minimum value of a jerk vector having longitudinal jerk and lateral jerk as components. This makes it possible to evaluate deceleration stability upon turning through the second evaluation value, according to the present invention. Further, the third evaluation value calculation unit calculates the third evaluation value on the basis of an absolute value of longitudinal acceleration at an ending point at which an absolute value of lateral acceleration becomes a maximum. This makes it possible to evaluate lateral acceleration efficiency upon turning through the third evaluation value. As described above, according to the driving evaluation system of the present invention, it is possible to comprehensively evaluate the driving skills of a turning scene by quantifying acceleration continuity, deceleration stability, and lateral acceleration efficiency upon turning.

According to the third aspect, the first evaluation value calculation unit sets the first evaluation value to a larger value as the shape of a trajectory of time series data from a starting point to an ending point approaches the shape of a predetermined reference trajectory. This makes it possible to make a comprehensive evaluation value larger as the acceleration continuity upon turning is higher, thereby appropriately evaluating driving skills. The second evaluation value calculation unit sets the second evaluation value to a smaller value as a minimum value of the jerk vector deviates from 0. The minimum value of the jerk vector deviates from 0 as the deceleration stability upon turning becomes lower. Therefore, according to the driving evaluation system of the present invention, it is possible to set a comprehensive evaluation value smaller as the deceleration stability upon turning becomes lower, thereby appropriately evaluating driving skills. The third evaluation value calculation unit sets the third evaluation value to a smaller value as an absolute value of longitudinal acceleration at an ending point deviates from 0. The absolute value of the longitudinal acceleration at the ending point deviates from 0 as the lateral acceleration efficiency upon turning becomes lower. Therefore, according to the driving evaluation system of the present invention, it is possible to set a comprehensive evaluation value smaller as the lateral acceleration efficiency upon turning becomes lower, thereby appropriately evaluating driving skills.

According to the fourth aspect, as described later with reference to FIG. 8A, as the acceleration continuity upon turning is higher, the shape of a trajectory of time series data of longitudinal acceleration and lateral acceleration from a starting point to an ending point approaches an elliptic arc having the starting point as an intersection point with any one of a major axis and a minor axis, and the ending point as an intersection point with the other axis. Therefore, according to the driving evaluation system of the present invention, it is possible to set the shape of the reference trajectory to an elliptic arc, thereby appropriately evaluating driving skills upon turning.

With the driving evaluation system according to the fifth aspect of the present invention, a turning scene is defined as a section in which magnitude of an acceleration vector having longitudinal acceleration and lateral acceleration as components is equal to or more than a predetermined value continues over a predetermined period of time and a maximum value of an absolute value of the lateral acceleration is equal to or more than a predetermined value, and driving skills in the turning scene is evaluated by using in-turn data in this section. According to the present invention, by defining the turning scene in this way, it is possible to appropriately evaluate a driver's driving skills upon actual turning from the driver depressing the brake pedal to thereby decelerate a vehicle, thereafter, starting a steering manipulation, and then starting depressing the accelerator pedal as described above.

With the driving evaluation system according to the sixth of the present invention, a case in which a period of time of a state in which magnitude of a jerk vector continues to be equal to or more than a predetermined value is less than 5 seconds or a case equal to or more than 15 seconds are excluded from the turning scene. This makes it possible to exclude a lane change or traveling along a gentle curve from the turning scene, thereby excluding from the evaluation target for driving skills.

According to the seventh aspect, in an acceleration-deceleration scene without turning a vehicle, an acceleration vector value becomes constant as the acceleration becomes stable, and the jerk vector value approaches 0. Therefore, in the driving evaluation system of the present invention, driving skills in an acceleration-deceleration scene are evaluated on the basis of a ratio of an acceleration vector value having the longitudinal acceleration and the lateral acceleration as components relative to a maximum value of the acceleration vector in the acceleration-deceleration scene, or a ratio of a jerk vector value having the longitudinal acceleration and the lateral acceleration as components relative to a maximum value of the jerk vector in the acceleration-deceleration scene. This makes it possible to appropriately evaluate a driver's driving skills in the acceleration-deceleration scene without turning a vehicle.

BRIEF DESCRIPTION OF THE DRAWINGS

FIG. 4 is a table compiling evaluation methods of driving skills for each traveling scene by a driving skills evaluation unit;

FIG. 6A is a graph illustrating an example of in-turn data acquired by the in-turn data acquisition unit;

FIG. 9 is a flowchart illustrating a specific procedure for evaluating driving skills of a driver in the driving evaluation system.

DETAILED DESCRIPTION OF THE INVENTION

Figure 1:
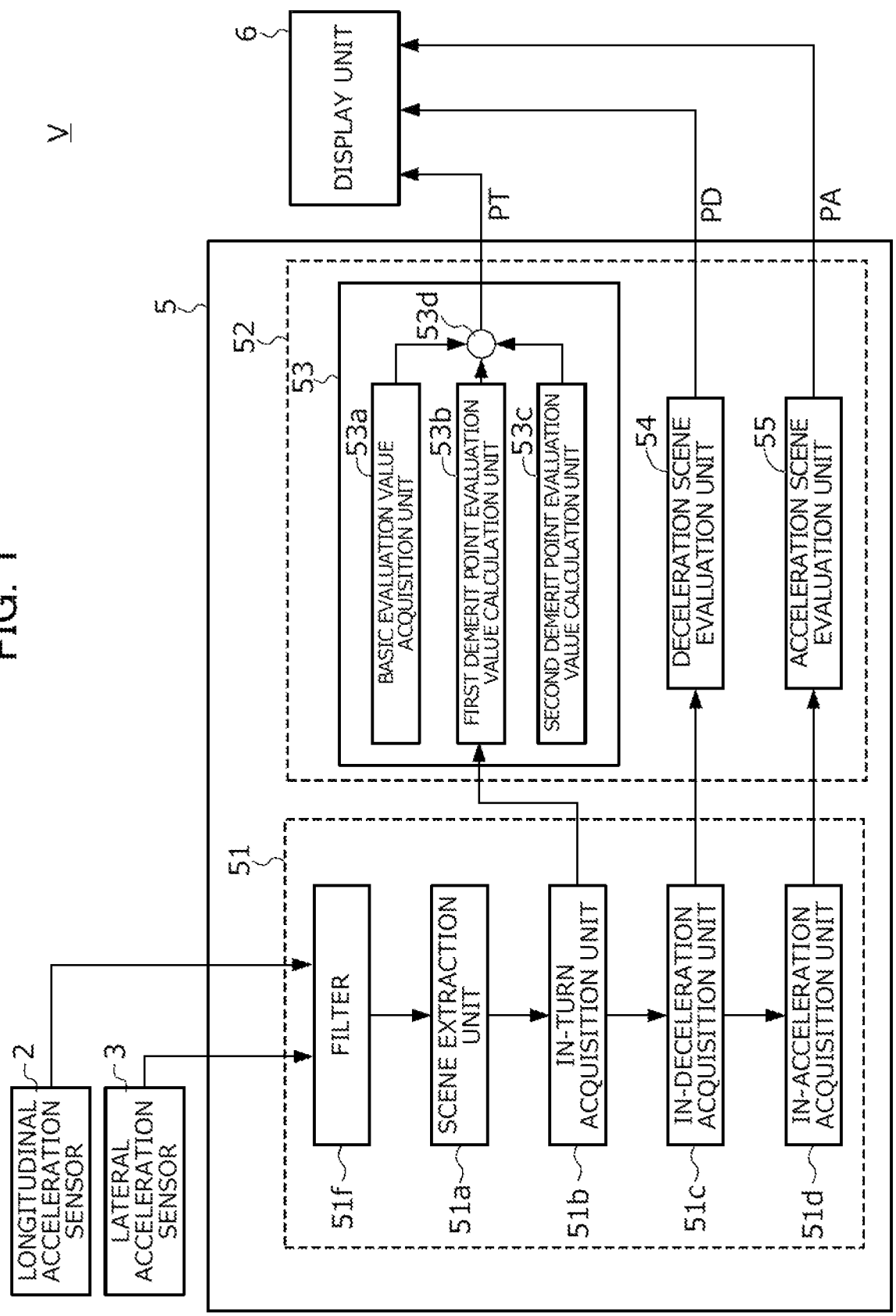
FIG. 1 is a diagram illustrating a configuration of a vehicle equipped with a driving evaluation system according to an embodiment of the present invention.

Hereinafter, an embodiment of the present invention will be described with reference to the drawings. FIG. 1 is a diagram illustrating a configuration of a vehicle V equipped with a driving evaluation system 1 according to the present embodiment.

The driving evaluation system 1 includes: a longitudinal acceleration sensor 2 that detects longitudinal acceleration along a traveling direction of a vehicle V; a lateral acceleration sensor 3 that detects lateral acceleration along a width direction of the vehicle V; an ECU (Electronic Control Unit) 5 that evaluates driving skills of the vehicle V by a driver on the basis of detection signals of these acceleration sensors 2 and 3; and a display unit 6 that displays evaluation results of the driving skills by the ECU 5 in a manner that is visually recognizable to the driver, or the like.

The longitudinal acceleration sensor 2 is attached to the body of the vehicle V, detects the longitudinal acceleration along the traveling direction of the vehicle V; and transmits a signal corresponding to a detection value to the ECU 5. For the longitudinal acceleration sensor 2, for example, a uni-axial acceleration sensor is used which is attached to the vehicle body in such a manner that the detection axis of the uniaxial acceleration sensor is in parallel with the traveling direction. It should be noted that, hereinafter, a case will be description in which the detection value of the longitudinal acceleration sensor 2 becomes positive upon deceleration of the vehicle V and becomes negative upon acceleration of the vehicle V; however, the present invention is not limited thereto.

The lateral acceleration sensor 3 is attached to the body of the vehicle V, detects the lateral acceleration along the width direction that is perpendicular to the traveling direction, and transmits a signal corresponding to the detection value to the ECU 5. For the lateral acceleration sensor 3, for example, a uniaxial acceleration sensor is used which is attached to the vehicle body in such a manner that a detection axis of the uniaxial acceleration sensor is in parallel with the width direction. It should be noted that, hereinafter, a case is described in which the detection value of the lateral acceleration sensor 3 becomes positive upon deceleration of the vehicle V and becomes negative upon acceleration of the vehicle V; however, the present invention is not limited thereto.

The ECU 5 is an on-vehicle computer that is configured by a CPU, ROM, RAM, a data bus, an input/output interface, etc. The ECU 5 executes various kinds of arithmetic processing in the CPU in accordance with programs stored in the ROM, thereby functioning as a data acquisition unit 51 and a driving skills evaluation unit 52 as described below.

The data acquisition unit 51 uses the detection signals that are transmitted from the longitudinal acceleration sensor 2 and the lateral acceleration sensor 3 during traveling of the vehicle V, thereby generating time series data of the longitudinal acceleration and the lateral acceleration during traveling. More specifically, the data acquisition unit 51 includes a filter 51f, a scene extraction unit 51a, an in-turn data acquisition unit 51b, an in-deceleration data acquisition unit 51c, and an in-acceleration data acquisition unit 51d, and uses these to thereby generate the time series data.

The filter 51f performs filter processing for the detection values from the longitudinal acceleration sensor 2 and the lateral acceleration sensor 3 in order to remove high frequency noise therefrom, and transmits a resultant filter value to the scene extraction unit 51a. Here, more specifically, a weighted moving average is used for the filter processing, for example. It should be noted that, in the following, a filter value of the detection value from the longitudinal acceleration sensor 2 obtained through the filter 51f is denoted as XG, and a filter value of the detection value of the lateral acceleration sensor 3 obtained through the filter 51f is denoted as YG.

The scene extraction unit 51a extracts, as evaluation target data, the time series data as an evaluation target in the driving evaluation system 1 among the time series data of the longitudinal acceleration and the lateral acceleration obtained from the longitudinal acceleration sensor 2 and the lateral acceleration sensor 3 through the filter 51f during the traveling of the vehicle V. More specifically, the scene extraction unit 51a uses the longitudinal acceleration value XG and the lateral acceleration value YG to calculate, at each point of time, an acceleration vector value VG having the longitudinal acceleration and the lateral acceleration as its components in accordance with the following expression (1), and extracts the evaluation target data by using the acceleration vector value VG.

$$VG = (XG^2 + YG^2)^{1/2} \quad (1)$$

Figure 2:
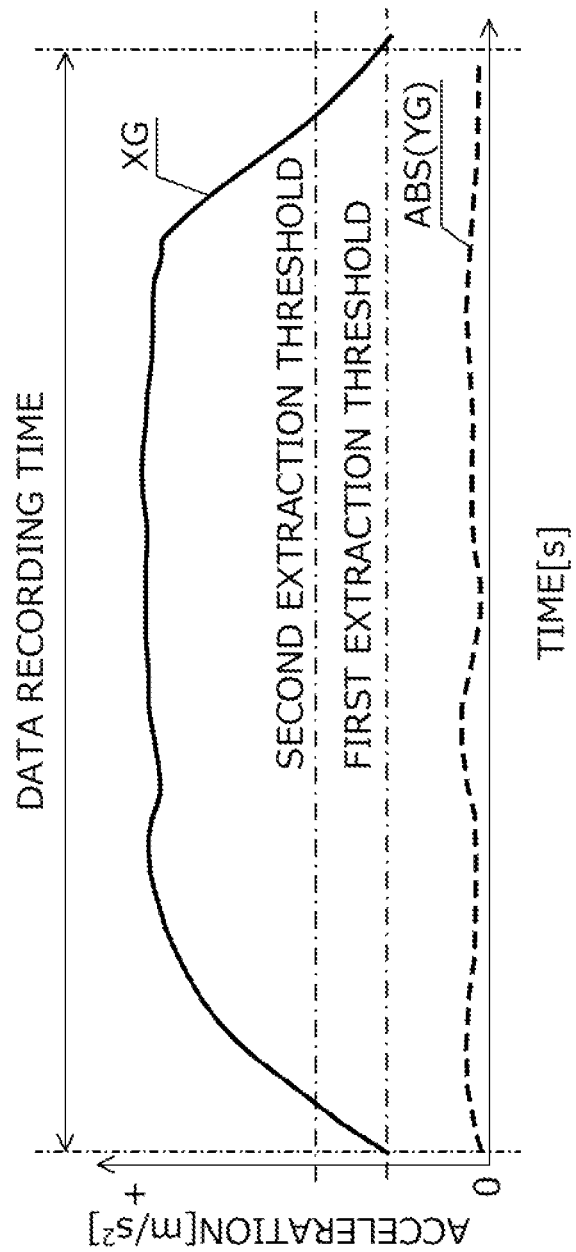
FIG. 2 is a graph illustrating an example of evaluation target data extracted by a scene extraction unit.

FIG. 2 is a graph illustrating an example of evaluation target data extracted by the scene extraction unit 51a. It should be noted that FIG. 2 illustrates the longitudinal acceleration value XG and an absolute value ABS (YG) of the lateral acceleration value YG. It should be noted that the acceleration vector value VG mostly overlaps with the longitudinal acceleration value XG. Therefore, the illustration is omitted in FIG. 2.

The scene extraction unit 51a extracts, as evaluation target data, time series data which satisfy all of the following three conditions (a), (b), and (c) from among the time series data of the longitudinal acceleration and the lateral acceleration transmitted from the longitudinal acceleration sensor 2 and the lateral acceleration sensor 3. The scene extraction unit 51a generates, as the evaluation target data, the time series data that satisfy the following conditions, to thereby make it possible to extract only data that are worth evaluating the driving skills from among many pieces of data transmitted from the longitudinal acceleration sensor 2 and the lateral acceleration sensor 3.

(a) The acceleration vector value VG is equal to or more than a first extraction threshold (for example, 0.6 [m/s$^2$]).
(b) Data recording time indicating the length of evaluation target data is at least 5 seconds and within 15 seconds.
(c) The average value AVE(VG) of the acceleration vector value VG is equal to or more than a second extraction threshold (for example, 1 [m/s$^2$]).

The data acquisition unit 51 divides the evaluation target data that are extracted by the scene extraction unit 51a into three types of a turning scene, a deceleration scene, and an acceleration scene, and generates the time series data for each scene.

The in-turn data acquisition unit 51b acquires evaluation target data that satisfy a predetermined condition from among the evaluation target data extracted by the scene extraction unit 51a, as the in-turn data including the time series data of the longitudinal acceleration and the lateral acceleration in the turning scene.

Figure 3:
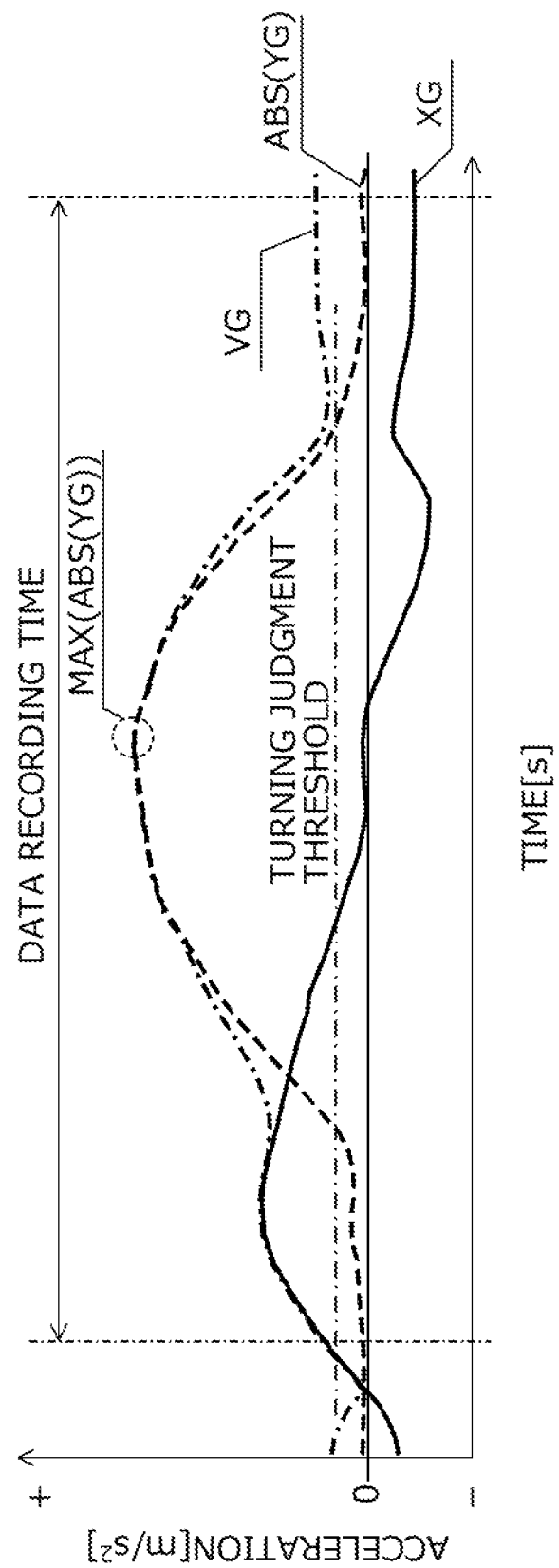
FIG. 3 is a graph illustrating an example of in-turn data acquired by an in-turn data acquisition unit.

FIG. 3 is a graph illustrating an example of the in-turn data acquired by the in-turn data acquisition unit 51b. The in-turn data acquisition unit 51b calculates the maximum value MAX (ABS(YG)) of the absolute value ABS(YG) of the lateral acceleration value YG included in the evaluation target data extracted by the scene extraction unit 51a, and in a case in which the maximum value MAX (ABS(YG)) is equal to or more than a predetermined turning judgment threshold (for example, 1 [m/s$^2$]), the in-turn data acquisition unit 51b acquires the evaluation target data as the in-turn data.

Therefore, turning scene in the present embodiment refers to a section in which a state having an acceleration vector value VG equal to or more than the first extraction threshold continues for at least 5 seconds and within 15 seconds, the average value AVE(VG) of the acceleration vector is equal to or more than the second extraction threshold, and the maximum value MAX (ABS(YG)) of the lateral acceleration is equal to or more than the turning judgment threshold.

The in-deceleration data acquisition unit 51c acquires, as in-deceleration data including the time series data of the longitudinal acceleration and the lateral acceleration in the deceleration scene, evaluation target data that satisfy a predetermined condition from among evaluation target data in which the in-turn data is subtracted from the evaluation target data extracted by the scene extraction unit 51a. More specifically, the in-deceleration data acquisition unit 51c calculates the average value AVE(XG) of the longitudinal acceleration value XG included in the evaluation target data from which the in-turn data is excluded and, in a case in which the average value (AVE(XG)) is 0 m/s$^2$, the in-deceleration data acquisition unit 51c acquires the evaluation target data as the in-deceleration data.

Therefore, deceleration scene in the present embodiment is a traveling scene that is different from the turning scene, and refers to a section in which a state having an acceleration vector value VG equal to or more than the first extraction threshold continues for at least 5 seconds and within 15 seconds, the average value AVE(VG) of the acceleration vector is equal to or more than the second extraction threshold, and the average value AVE(XG) of the longitudinal acceleration is more than 0.

The in-acceleration data acquisition unit 51d acquires, as in-acceleration data including the time series data of the longitudinal acceleration and the lateral acceleration in the acceleration scene, data in which the in-turn data and the in-deceleration data are subtracted from the evaluation target data extracted from the scene extraction unit 51a.

Therefore, the acceleration scene in the present embodiment is a traveling scene that is different from the turning scene, and refers to a section in which a state having an acceleration vector value VG equal to or more than the first extraction threshold continues for at least 5 seconds and within 15 seconds, the average value AVE(VG) of the acceleration vector is equal to or more than the second extraction threshold, and the average value AVE(XG) of the longitudinal acceleration is equal to or less than 0.

The driving skills evaluation unit 52 evaluates the driving skills in each traveling scene on the basis of the evaluation target data (the in-turn data, the in-deceleration data, and the in-acceleration data) acquired by the data acquisition unit 51 as described above.

FIG. 4 is a table compiling evaluation methods of driving skills for each traveling scene by driving skills evaluation unit 52. The driving skills evaluation unit 52 evaluates the driving skills in the deceleration scene by a driving evaluation value PD, evaluates the driving skills in the acceleration scene by a driving evaluation value PA, and evaluates the driving skills in the turning scene by a driving evaluation value PT. As illustrated in FIG. 4, the driving skills evaluation unit 52 evaluates the driving skills in each traveling scene according to a 10-point ranking system. In other words, the driving skills evaluation unit 52 evaluates the driving skills in each traveling scene by means of the driving evaluation values PD, PA, and PT which are quantified by a positive real number of no more than 10. It should be noted that, for these driving evaluation values, the evaluation of the driving skills is higher with a larger value. More specifically, the driving skills evaluation unit 52 includes a turning scene evaluation unit 53 that evaluates the driving skills in the turning scene, a deceleration scene evaluation unit 54 that evaluates the driving skills in the deceleration scene, and an acceleration scene evaluation unit 55 that evaluates the driving skills in the acceleration scene, and calculates the driving evaluation values PT, PD, and PA by means of these evaluation units 53, 54, and 55. In the following, a specific evaluation procedure by means of each of the evaluation units 53, 54, and 55 will be described.

The deceleration scene evaluation unit 54 calculates, under the 10-point ranking system, the driving evaluation value PD prepared by quantifying the driving skills of the driver in the deceleration scene specified by the in-deceleration data on the basis of the in-deceleration data acquired by the in-deceleration data acquisition unit 51c. More specifically, the deceleration scene evaluation unit 54 uses the time series data of the acceleration vector value VG acquired by the in-deceleration data or the time series data of the jerk vector value VJ indicated by the following expression (2) to thereby calculate the driving evaluation value PD in the deceleration scene. Here, jerk vector refers to a vector having longitudinal jerk and lateral jerk as components. It is possible to calculate the time series data of the jerk vector value VJ by applying time differential to each of the longitudinal acceleration value XG and the lateral acceleration value YG included in the in-deceleration data to compute a longitudinal jerk calculated value XJ and a lateral jerk calculated value YJ, thereby performing calculation with the following expression (2) using these calculated values XJ and YJ.

$$VJ=(XJ^2+YJ^2)^{1/2} \quad (2)$$

Figure 5A:
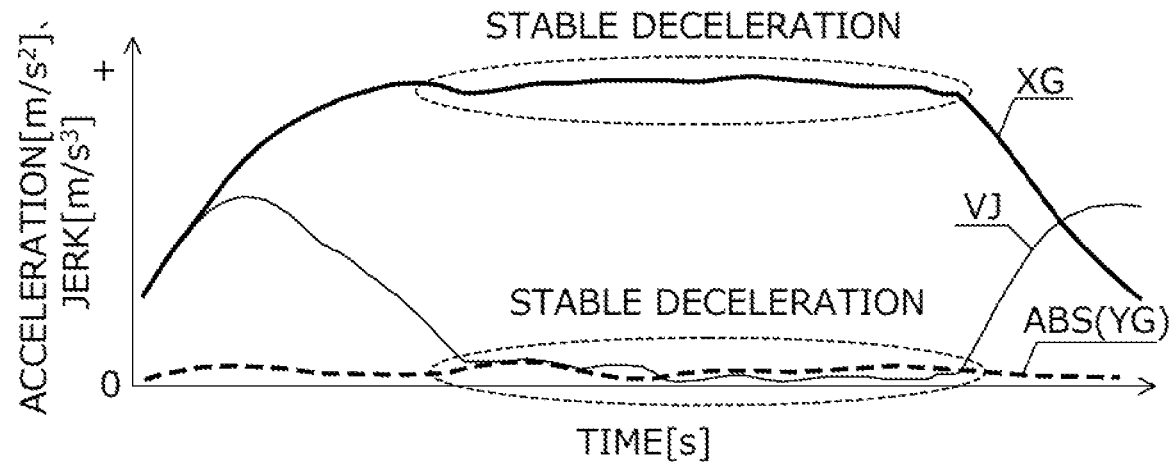
FIG. 5A is a graph illustrating an example of time series data of a longitudinal acceleration value, a lateral acceleration value, and a jerk vector value in a deceleration scene (in a case in which the driver is an expert driver)
Figure 5B:
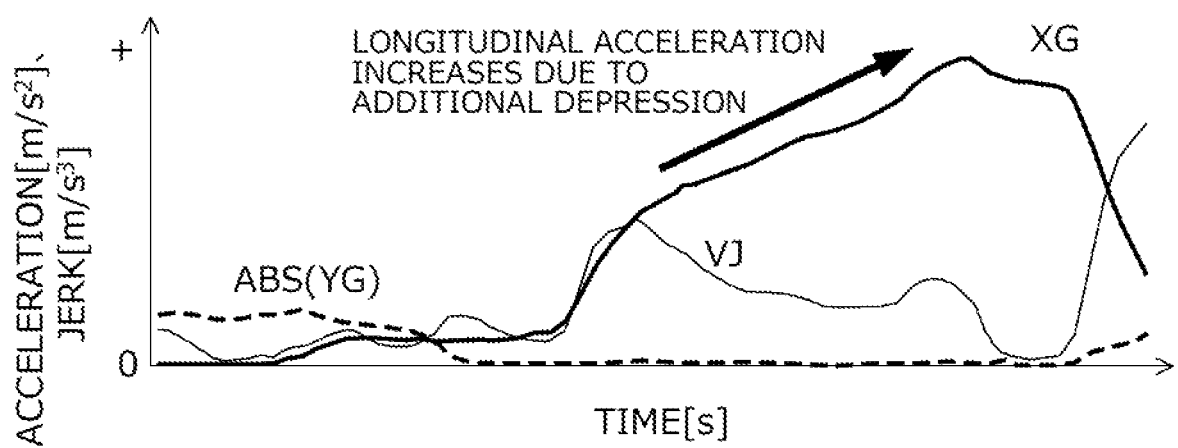
FIG. 5B is a graph illustrating an example of time series data of a longitudinal acceleration value, a lateral acceleration value, and a jerk vector value in a deceleration scene (in a case in which the driver is a normal driver)

FIGS. 5A and 5B are each a graph illustrating an example of time series data of a longitudinal acceleration value XG, a lateral acceleration value YG, and a jerk vector value VJ in a deceleration scene. More specifically, FIG. 5A illustrates an example of time series data in a case in which the driver is an expert driver, and FIG. 5B illustrates an example of time series data in a case in which the driver is a normal driver.

In a deceleration scene in which the vehicle speed is decelerated during a target period of time from a predetermined speed to a target speed, it is generally preferable for the amount of depressing the brake pedal to be constant. Since the expert driver can decelerate the vehicle as he/she wishes to the target speed during the target period of time without substantially changing the amount of depressing the brake pedal during the deceleration of the vehicle, as illustrated in FIG. 5A, in the deceleration scene, a period of time in which the longitudinal acceleration value XG and the acceleration vector value VG become constant is long. Therefore, the jerk vector value VJ becomes in a convex shape at the deceleration start time as illustrated in FIG. 5A. However, thereafter, the value VJ becomes constant in the vicinity of 0.

In contrast, the normal driver cannot decelerate the vehicle as he/she wishes during the target period of time, and may further depress the brake pedal at the final period of the deceleration. For this reason, as illustrated in FIG. 5B, the period of time in which the longitudinal acceleration value XG becomes constant in the deceleration scene is short as compared to the period of time by the expert driver. Therefore, the jerk vector value VJ transitions to deviate from 0, as illustrated in FIG. 5B.

In view of the above, it can be recognized as appropriate for the driving skills of the driver in the deceleration scene to be evaluated by using the acceleration vector value VG or the jerk vector value VJ that is obtained by the in-deceleration data.

Incidentally, it is preferable for the evaluation value of the driving skills to be uniquely defined only by the driver's driving skills irrespective of whether it is during driving at a high speed or low speed. However, the acceleration vector value VG and the jerk vector value VJ may change, even if the same driver, depending on whether it is during driving at a high speed or low speed. For example, there is a tendency of the change in the acceleration vector value VG and the jerk vector value VJ becoming larger during driving at a high speed than during driving at a low speed. Therefore, the deceleration scene evaluation unit 54 calculates the driving evaluation value PD on the basis of the ratio of the acceleration vector value VG to the maximum value MAX(VG) of the acceleration vector value over the recording time of the in-deceleration data, or the ratio of the jerk vector value VJ to the maximum value MAX(VJ) of the jerk vector value over the recording time of the in-deceleration data. In the following, an evaluation procedure using the ratio of the acceleration vector and an evaluation procedure using the ratio of the jerk vector are described sequentially.

In a case of performing evaluation using the ratio of the acceleration vector, the deceleration scene evaluation unit 54 divides the recording time of the in-deceleration data into N points (N is an integer equal to or more than 2), acquires an acceleration vector value VG(i) (i is an integer from 1 to N) at each point of time, and further calculates the maximum value MAX(VG) of the acceleration vector value VG over the recording time of the in-deceleration data. In addition, the deceleration scene evaluation unit 54 calculates the ratio (VG(i)/MAX(VG)) of the acceleration vector value VG(i) at each point of time to the maximum value MAX(VG), and further calculates an average value of these ratios (VG(1)+ VG(2)+ . . . +VG (N))/MAX(VG)/N. The average value calculated as described above tends to approach 1 as the change in the acceleration vector value VG becomes smaller, and tends approach 0 as the change in the acceleration vector value VG becomes larger. Therefore, the deceleration scene evaluation unit 54 sets a value calculated by multiplying the average value by a value 10 as the driving evaluation value PD. This makes it possible to calculate the driving evaluation value PD by means of the 10-point ranking system.

Furthermore, in a case of performing an evaluation using the ratio of the jerk vector, the deceleration scene evaluation unit 54 divides the recording time of the in-deceleration data into M points (M is an integer equal to or more than 2), acquires a jerk vector value VG(j) (j is an integer from 1 to M) at each point of time, and further calculates the maximum value MAX(VJ) of the jerk vector value VJ over the recording time of the in-deceleration data. In addition, the deceleration scene evaluation unit 54 calculates the ratio (VJ(j)/MAX(VJ)) of the jerk vector value VJ(j) at each point of time to the maximum value MAX(VJ), and further calculates an average value of these ratios (VJ(1)+ VJ(2)+ . . . +VJ(M))/MAX(VJ)/M. The average value calculated as described above tends to approach 0 as the jerk vector value VJ(j) at each point of time comes closer to 0, and tends to become larger than 0 as the jerk vector value VJ(j) at each point of time distances from the value 0 to become larger. Therefore, the deceleration scene evaluation unit 54 performs a predetermined normalization processing on the average value calculated as above to thereby calculate the driving evaluation value PD for the deceleration scene. The normalization processing here refers to processing of converting the above-described average value into the driving evaluation value PD so that the driving evaluation value PD approaches 10 which is the maximum points as the average value approaches 0, and the driving evaluation value PD becomes smaller as the average value becomes larger. Furthermore, the driving evaluation value PD calculated by the deceleration scene evaluation unit 54 as described above is displayed on a display unit 6, and can be confirmed by a driver.

The acceleration scene evaluation unit 55 calculates, under the 10-point ranking system, the driving evaluation value PA prepared by quantifying the driving skills of the driver in the acceleration scene specified by the in-acceleration data on the basis of the in-acceleration data acquired by the in-acceleration data acquisition unit 51*d*. It should be noted that the acceleration scene differs from the deceleration scene in that a sign for the longitudinal acceleration value becomes opposite; however, it is basically possible to calculate the driving evaluation value PA under the 10-point ranking system by using the acceleration vector value VG or the jerk vector value VJ, similarly to the case of the deceleration scene. Therefore, explanations will be omitted hereinafter for descriptions of a specific procedure for calculating the driving evaluation value PA in the acceleration scene evaluation unit 55. Furthermore, the driving evaluation value PA calculated by the acceleration scene evaluation unit 55 as described above is displayed on the display unit 6, and can be confirmed by a driver.

The turning scene evaluation unit 53 calculates, under the 10-point ranking system, the driving evaluation value PT prepared by quantifying the driving skills of the driver in the turning scene specified by the in-turn data on the basis of the in-turn data acquired by the in-turn data acquisition unit 51*b*.

Figure 6B:
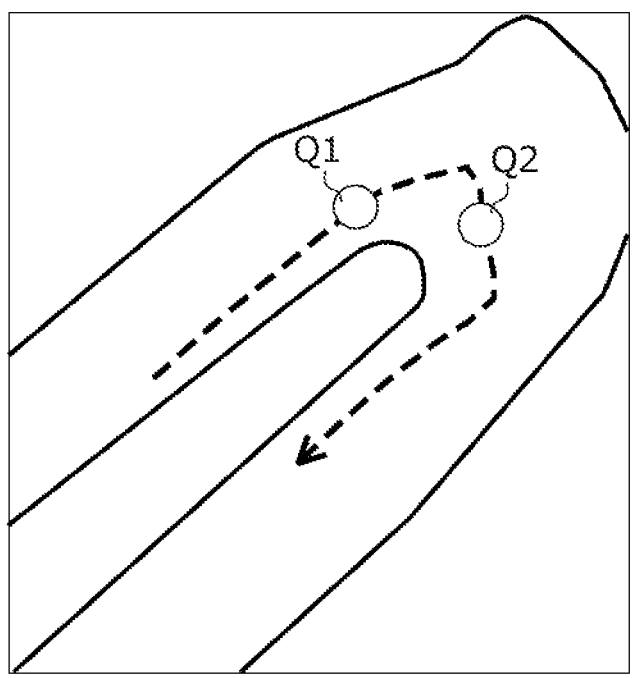
FIG. 6B is a diagram in which an actual traveling trajectory of a vehicle when the in-turn data in FIG. 6A is acquired is plotted on a road map.

FIG. 6A is a graph illustrating an example of the in-turn data acquired by the in-turn data acquisition unit 51*b*. FIG. 6B is a diagram in which an actual traveling trajectory of the vehicle V when the in-turn data in FIG. 6A is acquired is plotted on a road map. It should be noted that FIG. 6A illustrates not only the time series data of the longitudinal acceleration value XG and the lateral acceleration value YG included in the in-turn data, but also time series data of the acceleration vector value VG and the jerk vector value VJ that are calculated by using these values XG and YG.

As illustrated in FIG. 6A, generally speaking, during turning of a vehicle, the driver decelerates the vehicle V by depressing the brake pedal during the time t0 to the vicinity of time t1, turns the vehicle V by starting a steering manipulation from the vicinity of the time t1 at which the longitudinal acceleration becomes a maximum, and thereafter, accelerates the vehicle V by starting depressing of the accelerator pedal in the vicinity of the time t2 at which the absolute value of the lateral acceleration becomes a maximum. In FIG. 6B, the position of the vehicle V at the time t1 is denoted by the circle Q1, and the position of the vehicle V at the time t2 is denoted by the circle Q2.

The turning scene evaluation unit 53 calculates the driving evaluation value PT by comprehensively evaluating deceleration stability indicating the stability of acceleration at the time of starting the steering manipulation in the vicinity of time t1 in FIG. 6A, lateral acceleration efficiency indicating the stability of acceleration at the time of ending the turning and transitioning to the acceleration in the vicinity of time t2 in FIG. 6A, and acceleration continuity indicating the stability of continuity of the acceleration from the longitudinal direction to the lateral direction realized between time t1 and time t2 (refer to FIG. 4).

More specifically, the turning scene evaluation unit 53 includes: a basic evaluation value calculation unit 53*a* for calculating a basic evaluation value PTb in which the acceleration continuity is quantified by a positive real number of no more than 10; a first demerit point evaluation value calculation unit 53*b* for calculating a first demerit point evaluation value PTd1 in which the deceleration stability is quantified by a negative real number with 0 as the maximum value and about −1 as the minimum value; a second demerit point evaluation value calculation unit 53*c* for calculating a second demerit point evaluation value PTd2 in which the lateral acceleration efficiency is quantified by a negative real number with 0 as the maximum value and about −1 as the minimum value; and a comprehensive evaluation value calculation unit 53*d* for calculating a driving evaluation value PT in which the driving skills of the driver in the turning scene is quantified by a positive real number of no more than 10 by summing these evaluation values PTb, PTd1, and PTd2. As described above, the driving evaluation value PT calculated by the turning scene evaluation unit 53 and the respective evaluation values PTb, PTd1, and PTd2 constituting the driving evaluation value PT are displayed on the display unit 6, and can be confirmed by a driver.

As illustrated in FIG. 4, the turning scene evaluation unit 53 evaluates the acceleration continuity under the 10-point ranking system, and evaluates the deceleration stability and the lateral acceleration efficiency under a demerit point system. The basic evaluation value PTb may have a value of about 0 to 10, which is larger than the values (about −1 to 0) that the first demerit point evaluation value PTd1 and the second demerit point evaluation value PTd2 may have. That is, the turning scene evaluation unit 53 calculates the driving evaluation value PT in the turning scene with weight larger than the deceleration stability and the lateral acceleration efficiency with respect to the acceleration continuity that is particularly apt to cause a difference in level of the driving skills among the acceleration continuity, the deceleration stability, and the lateral acceleration efficiency. Hereinafter, specific procedures for calculating the evaluation values PTb, PTd1, and PTd2 in the respective evaluation value calculation units 53*a*, 53*b*, and 53*c* will be described.

First, procedures for calculating the basic evaluation value PTb in the basic evaluation value calculation unit 53*a* will be described with reference to FIGS. 7A and 7B, and FIGS. 8A and 8B.

Figure 7A:
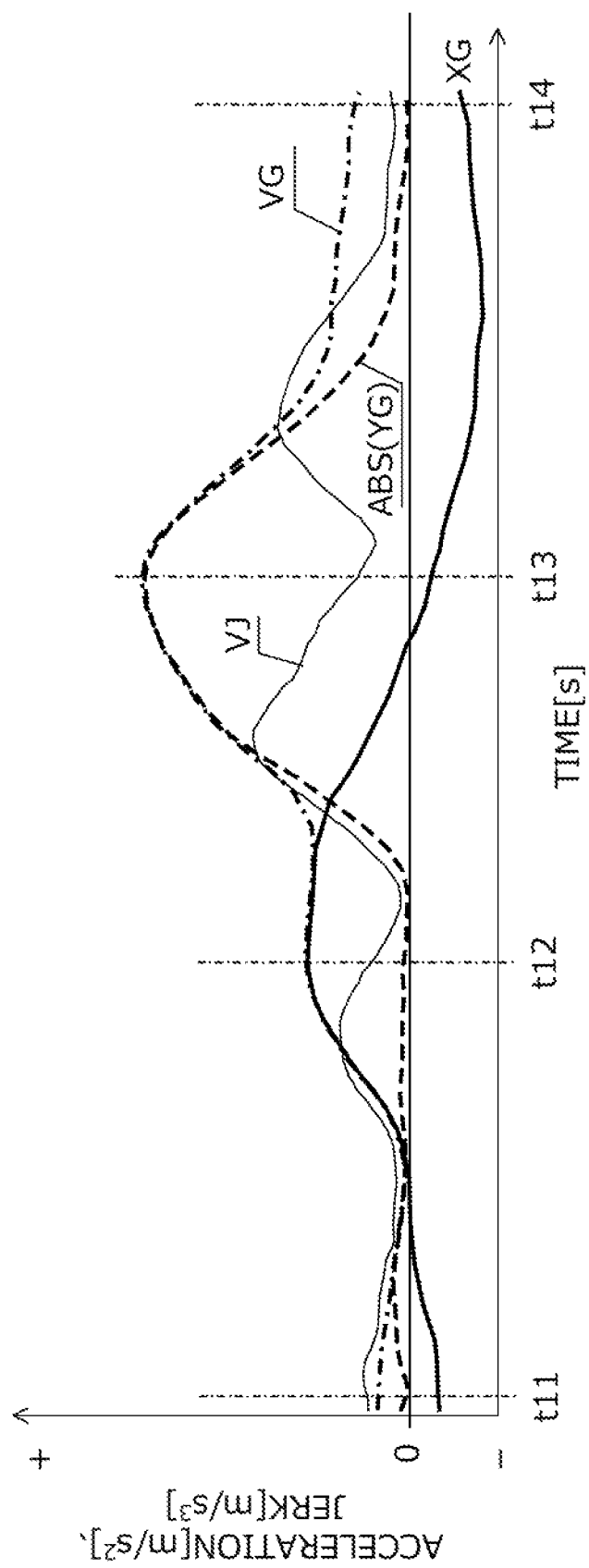
FIG. 7A is a graph illustrating time series data, etc., of longitudinal acceleration and lateral acceleration included in the in-turn data (in a case in which the driver is an expert driver)
Figure 7B:
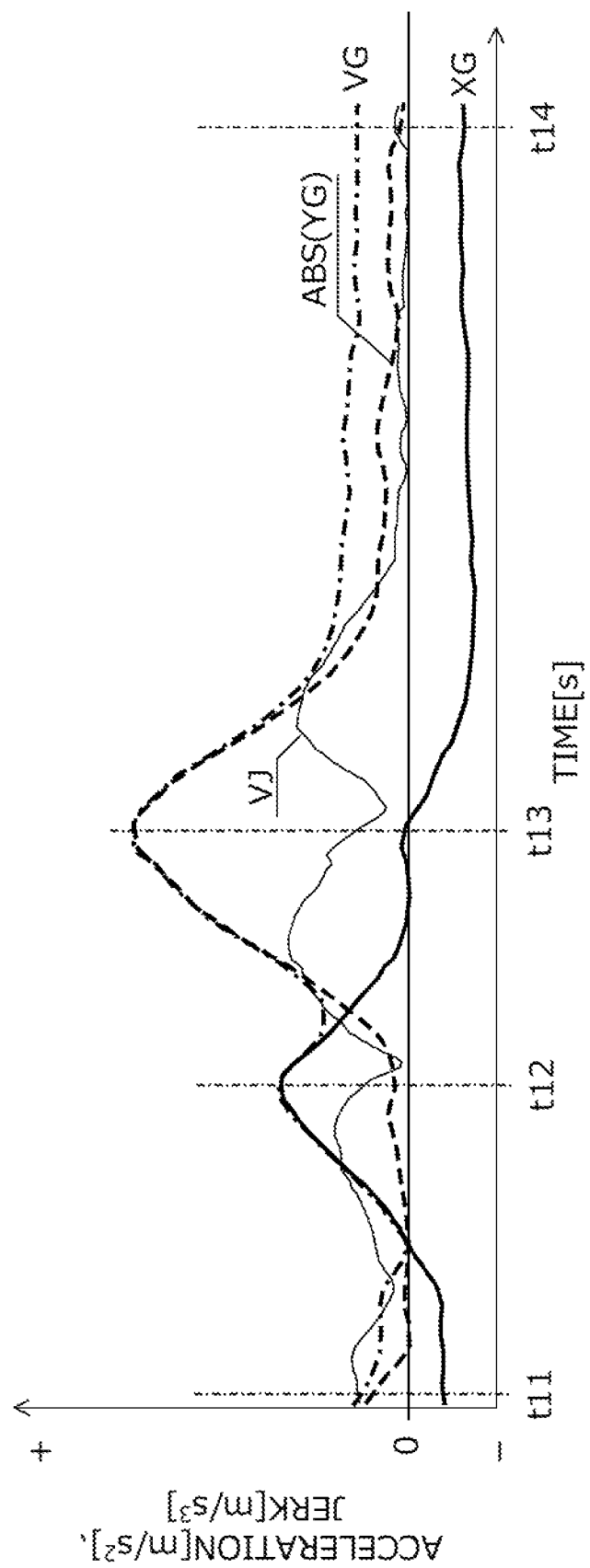
FIG. 7B is a graph illustrating time series data, etc., of longitudinal acceleration and lateral acceleration included in the in-turn data (in a case in which the driver is a normal driver)

FIGS. 7A and 7B are each a graph illustrating time series data of the longitudinal acceleration value XG and the lateral acceleration value YG included in the in-turn data, and the time series data of the acceleration vector value VG and the jerk vector value VJ that are calculated on the basis of the values XG and YG. More specifically, FIG. 7A illustrates an example of the in-turn data in a case in which a driver is an expert driver, and FIG. 7B illustrates an example of the in-turn data in a case in which the driver is a normal driver.

Figure 8A:
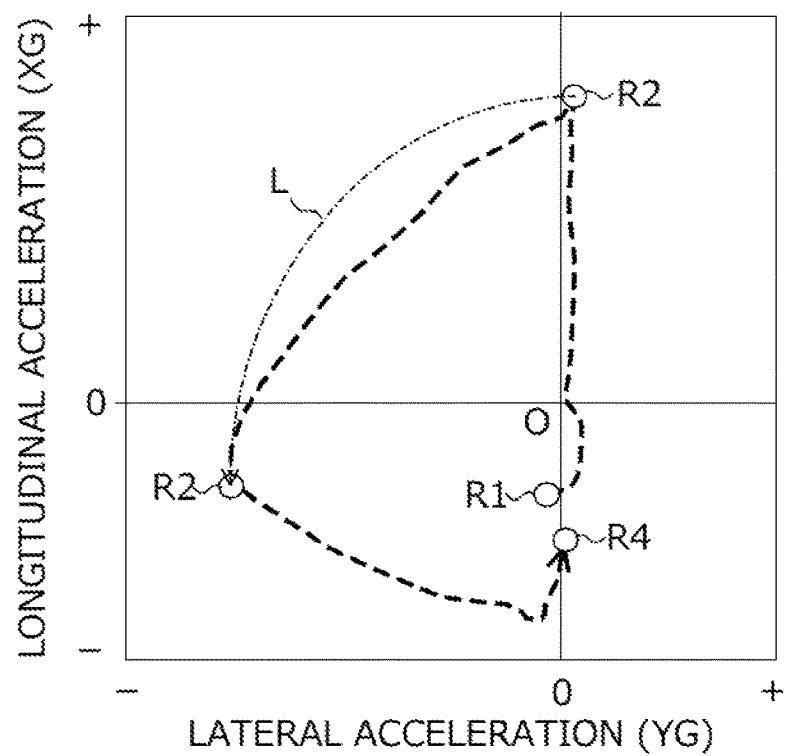
FIG. 8A is a diagram in which an acceleration vector included in the in-turn data of FIG. 7A is plotted on a two-dimensional plane with the longitudinal acceleration as a vertical axis and the lateral acceleration as a horizontal axis.
Figure 8B:
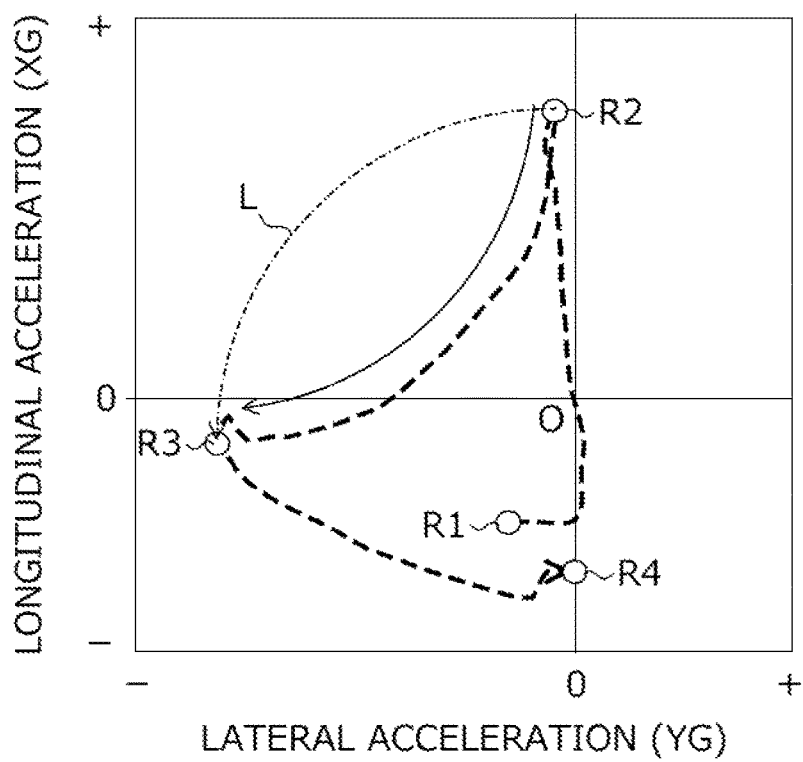
FIG. 8B is a diagram in which an acceleration vector included in the in-turn data of FIG. 7B is plotted on a two-dimensional plane with the longitudinal acceleration as a vertical axis and the lateral acceleration as a horizontal axis.

FIGS. 8A and 8B are each a diagram in which the acceleration vector having the longitudinal acceleration value XG and the lateral acceleration value YG as components and included in the in-turn data of FIGS. 7A and 7B are plotted on a two-dimensional plane with the longitudinal acceleration as the vertical axis and the lateral acceleration as the horizontal axis.

The acceleration vector in the turning scene changes in the order of point R1->point R2->point R3->point R4 illustrated in FIG. 8A and FIG. 8B. It should be noted that point R1, point R2, point R3, and point R4 in FIGS. 8A and 8B respectively correspond to time t11, time t12, time t13, and time t14 in FIGS. 7A and 7B. That is, point R2 in FIGS. 8A and 8B corresponds to time t2 at which the longitudinal acceleration value XG becomes a maximum in the turning scene, and point R3 corresponds to time t3 at which the absolute value ABS(YG) of the lateral acceleration value YG becomes a maximum in the turning scene.

As illustrated in FIGS. 8A and 8B, the shape of the trajectory of the acceleration vector in the turning scenes is substantially triangular in general irrespective of the driving skills of the driver. As is clear from comparing FIG. 8A with FIG. 8B, the driver's driving skills appear in the form of the trajectory of the acceleration vector from point R2 at which the longitudinal acceleration value XG becomes a maximum to point R3 at which the absolute value ABS(YG) of the lateral acceleration becomes a maximum. That is, the trajectory from point R2 to point R3 of the acceleration vector by the expert driver is convex outward from the origin O, more specifically, is close to an elliptic arc L having point R2 as an intersection with the major axis and point R3 as an intersection with the minor axis. On the other hand, as indicated by the thin-line arrow in FIG. 8B, the trajectory from point R2 to point R3 of the acceleration vector by the normal driver becomes concave toward the origin O. That is, the trajectory of the acceleration vector by the normal driver deviates from the elliptic arc L having point R2 as the intersection with the major axis and point R3 as the intersection with the minor axis. From the above, it can be said that the acceleration continuity indicating the stability of the continuity of the acceleration from point R2 at which the longitudinal acceleration becomes a maximum to point R3 at which the absolute value of the lateral acceleration becomes a maximum can be evaluated by comparing the shape of the trajectory of the acceleration vector from point R2 to point R3 with the shape of the elliptic arc L. That is, it can be said that the driving skills in the turning scene are higher as the trajectory of the acceleration vector from point R2 to point R3 is closer to the elliptic arc L.

Therefore, the basic evaluation value calculation unit 53a uses, as a starting point, point R2 at which the longitudinal acceleration value XG among the in-turn data becomes a maximum and, as an ending point, point R3 at which the absolute value of the lateral acceleration value YG is the maximum, and calculates the basic evaluation value PTb on the basis of the comparison between the shape of the trajectory of the time series data of the acceleration vector from the starting point to the ending point and the shape of a predetermined reference trajectory. More specifically, the reference trajectory here adopts an elliptic arc L having a starting point as an intersection point with one of the major axis and the minor axis and an ending point as an intersection point with the other axis. The basic evaluation value calculation unit 53a obtains the coordinate values of the start point and the end point from the in-turn data, derives an elliptic expression representing the elliptic arc L by using the coordinate values, and calculates the basic evaluation value PTb by quantifying, by a real number between about 0 and about 10 on the basis of a known algorithm, the proximity between the elliptic expression and the trajectory of the acceleration vector from the start point to the end point. That is, the basic evaluation value calculation unit 53a sets the basic evaluation value PTb to a larger value as the trajectory of the acceleration vector approaches the ellipse expression.

Next, procedures for calculating the first demerit point evaluation value PTd1 in the first demerit point evaluation value calculation unit 53b will be described. As illustrated in FIG. 6A, when the longitudinal acceleration is maximized in the vicinity of time t1 and the steering manipulation is started, it is preferable that both the longitudinal acceleration and the lateral acceleration are constant. That is, it can be said that the deceleration stability can be evaluated by the jerk vector value VJ in the vicinity of the time t1.

Therefore, the first demerit point evaluation value calculation unit 53b calculates the time series data of the jerk vector value VJ by using the in-turn data, calculates the minimum value MIN(VJ) of the jerk vector value VJ in the vicinity of time t1 at which the longitudinal acceleration value XG becomes a maximum, and calculates the first demerit point evaluation value PTd1 on the basis of the minimum value MIN(VJ) of the jerk vector. More specifically, the first demerit point evaluation value calculation unit 53b calculates the first demerit point evaluation value PTd1 such that the first demerit point evaluation value PTd1 becomes 0 when the minimum value MIN(VJ) of the jerk vector is 0, and the first demerit point evaluation value PTd1 distances from 0 to become smaller as the minimum value MIN(VJ) of the jerk vector distances from 0. As a result, the first demerit point evaluation value PTd1 of a negative value with 0 as the maximum value and about −1 as the minimum value is calculated.

Next, procedures for calculating the second demerit point evaluation value PTd2 in the second demerit point evaluation value calculation unit 53c will be described. As illustrated in FIG. 6A, when the absolute value ABS(YG) of the lateral acceleration becomes a maximum in the vicinity of the time t2 and transitions to acceleration, it is preferable for the longitudinal acceleration to approach 0. That is, it can be said that the lateral acceleration efficiency can be evaluated by the absolute value ABS(XG) of the longitudinal acceleration at time t2.

Therefore, the second demerit point evaluation value calculation unit 53c calculates the absolute value ABS(XG) of the longitudinal acceleration at the end point at which the absolute value ABS(YG) of the lateral acceleration reaches a maximum by using the in-turn data, and calculates the second demerit point evaluation value PTd2 on the basis of the absolute value ABS(XG) of the longitudinal acceleration. More specifically, the second demerit point evaluation value calculation unit 53c calculates the second demerit point evaluation value PTd2 such that the second demerit point evaluation value PTd2 becomes 0 when the absolute value ABS(XG) of the longitudinal acceleration is 0, and the second demerit point evaluation value PTd2 distances from 0 and becomes smaller as the absolute value ABS(XG) of the longitudinal acceleration distances from 0. As a result, the second demerit point evaluation value PTd2 having a negative value with 0 as the maximum value and about −1 as the minimum value is calculated.

FIG. 9 is a flowchart illustrating a specific procedure for evaluating driving skills of a driver in the driving evaluation system 1. The processing illustrated in FIG. 9 may be performed in real time while the vehicle V is traveling, or may be performed after traveling of the vehicle V.

First, in S1, the data acquisition unit 51 acquires the in-turn data, the in-deceleration data, and the in-acceleration data. More specifically, the scene extraction unit 51a extracts, as evaluation target data, time series data that satisfy the above conditions (a), (b), and (c) from among time series data of the longitudinal acceleration and the lateral acceleration obtained from the longitudinal acceleration sensor 2 and the lateral acceleration sensor 3 through the filter 51f while the vehicle V is traveling. The in-turn data acquisition unit 51b acquires the in-turn data including time series data of longitudinal acceleration and lateral acceleration in the turning scene from among the evaluation target data. The deceleration data acquiring unit 51c acquires the in-deceleration data including time series data of the longitudinal acceleration and the lateral acceleration in the deceleration scene from among the evaluation target data excluding the in-turn data. In addition, the in-acceleration data acquisition unit 51d acquires the in-acceleration data including time series data of the longitudinal acceleration and the lateral acceleration in the acceleration scene by excluding the in-turn data and the in-deceleration data from the evaluation target data.

Next, in S2, the turning scene evaluation unit 53 calculates the driving evaluation value PT in which the driver's driving skills in the turning scene are quantified on the basis of the in-turn data acquired in S1. More specifically, the basic evaluation value calculation unit 53a calculates the basic evaluation value PTb on the basis of the comparison between the shape of the trajectory of the time series data of the acceleration vector from the start point at which the longitudinal acceleration becomes a maximum to the end point at which the absolute value of the lateral acceleration becomes a maximum among the in-turn data and the shape of the reference trajectory. The first demerit point evaluation value calculation unit 53b calculates a minimum value of the jerk vector in the vicinity of the time at which the longitudinal acceleration becomes a maximum by using the in-turn data, and calculates the first demerit point evaluation value PTd1 on the basis of the minimum value of the jerk vector. The second demerit point evaluation value calculation unit 53c calculates the absolute value of the longitudinal acceleration at the end point at which the absolute value of the lateral acceleration reaches a maximum by using the in-turn data, and calculates the second demerit point evaluation value PTd2 on the basis of the absolute value of the longitudinal acceleration. Further, the comprehensive evaluation value calculation unit 53d calculates the driving evaluation value PT by summing the evaluation values PTb, PTd1, and PTd2.

Next, in S3, the deceleration scene evaluation unit 54 calculates, on the basis of the deceleration time data acquired in S1, a driving evaluation value PD in which the driver's driving skills in the deceleration scene are quantified. More specifically, the deceleration scene evaluation unit 54 calculates the driving evaluation value PD by using the average value and the maximum value of the jerk vector over the recording time of the in-deceleration data.

Next, in S4, the acceleration scene evaluation unit 55 calculates, on the basis of the in-acceleration data acquired in S1, the driving evaluation value PA in which the driver's driving skills in the acceleration scene are quantified. More specifically, the acceleration scene evaluation unit 55 calculates the driving evaluation value PA by using the average value and the maximum value of the jerk vector over the recording time of the in-acceleration data.

Figure 10:
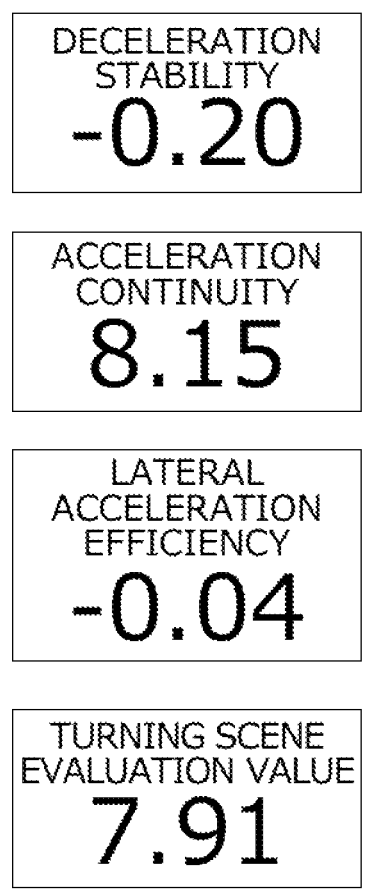
FIG. 10 is a view of display examples of evaluation results of the driving skills in a turning scene on a display unit.

Next, in S5, the ECU 5 displays, on the display unit 6, the driving evaluation values PT, PD, and PA calculated by the evaluation units 53, 54, and 55. Here, the driving evaluation value PT indicating the driving skills in the turning scene may be displayed on the display unit 6 as illustrated in FIG. 10, for example, together with the evaluation values PTb, PTd1, and PTd2 constituting the evaluation value PT. It should be noted that FIG. 10 illustrates an example in which "−0.20", which is the first demerit evaluation value PTd1, is displayed in the column of "deceleration stability", "8.15", which is the basic evaluation value PTb, is displayed in the column of "acceleration continuity", "−0.04", which is the second demerit evaluation value PTd2, is displayed in the column of "lateral acceleration efficiency", and "7.91", which is the driving evaluation value PT, is displayed in the column of "turning scene evaluation value".

Although an embodiment of the present invention has been described above, the present invention is not limited thereto. For example, in the embodiment described above, a case is described in which the driving evaluation system 1 is configured by combining the longitudinal acceleration sensor 2, the lateral acceleration sensor 3, the ECU 5, and the display unit 6 equipped to the vehicle V; however, the present invention is not limited to thereto. The driving evaluation system may be configured by a portable terminal such as a smartphone including a longitudinal acceleration sensor, a lateral acceleration sensor, a computer, and a display unit.

What is claimed is:

1. A driving evaluation system that evaluates driving skills of a vehicle by a driver, the system comprising:
an in-turn data acquisition unit configured to acquire in-turn data including time series data of longitudinal acceleration and lateral acceleration in a turning scene; and
a turning scene evaluation unit configured to evaluate driving skills in the turning scene on a basis of a shape of a trajectory of time series data from a starting point at which the longitudinal acceleration becomes a maximum to an ending point at which an absolute value of the lateral acceleration becomes a maximum, among the in-turn data in a case in which the longitudinal acceleration upon deceleration is positive,
wherein the turning scene evaluation unit includes:
a first evaluation value calculation unit that calculates a first evaluation value on a basis of the shape of the trajectory of the time series data from the starting point to the ending point
a second evaluation value calculation unit that calculates, on a basis of the in-turn data, time series data of a jerk vector having longitudinal jerk and lateral jerk as components, and calculates a second evaluation value on a basis of a minimum value of the jerk vector;
a third evaluation value calculation unit that calculates a third evaluation value on a basis of the absolute value of the longitudinal acceleration at the ending point and
a comprehensive evaluation value calculation unit that calculates a comprehensive evaluation value in which the driving skills in the turning scene is quantified, by summing the first evaluation value, the second evaluation value, and the third evaluation value.

2. The driving evaluation system according to claim 1, wherein the first evaluation value calculation unit sets the first evaluation value to a larger value as the shape of the trajectory of the time series data from the starting point to the ending point approaches a shape of a predetermined reference trajectory, the second evaluation value calculation unit sets the second evaluation value to a smaller value as a minimum value of the jerk vector deviates from 0, and the third evaluation value calculation unit sets the third evaluation value to a smaller value as the absolute value deviates from 0.

3. The driving evaluation system according to claim 2, wherein the reference trajectory is an elliptic arc having the starting point as an intersection point with any one of a major axis and a minor axis and the ending point as an intersection point with the other axis.

4. The driving evaluation system according to claim 1, wherein the turning scene is a section in which magnitude of an acceleration vector having longitudinal acceleration and lateral acceleration as components is equal to or more than a predetermined value continues over a predetermined period of time, and a maximum value of an absolute value of the lateral acceleration is equal to or more than a predetermined value.

5. The driving evaluation system according to claim 2, wherein the turning scene is a section in which magnitude of an acceleration vector having longitudinal acceleration and lateral acceleration as components is equal to or more than a predetermined value continues over a predetermined period of time, and a maximum value of an absolute value of the lateral acceleration is equal to or more than a predetermined value.

6. The driving evaluation system according to claim 3, wherein the turning scene is a section in which magnitude of an acceleration vector having longitudinal acceleration and lateral acceleration as components is equal to or more than a predetermined value continues over a predetermined period of time, and a maximum value of an absolute value of the lateral acceleration is equal to or more than a predetermined value.

7. The driving evaluation system according to claim 4, wherein the predetermined period of time is equal to or more than five seconds and within fifteen seconds.

8. The driving evaluation system according to claim 5, wherein the predetermined period of time is equal to or more than five seconds and within fifteen seconds.

9. The driving evaluation system according to claim 6, wherein the predetermined period of time is equal to or more than five seconds and within fifteen seconds.

10. The driving evaluation system according to claim 1, further comprising:

an in-acceleration and in-deceleration data acquisition unit that is configured to acquire in-acceleration and in-deceleration data including time series data of longitudinal acceleration and lateral acceleration in an acceleration-deceleration scene; and an acceleration-deceleration scene evaluation unit that evaluates driving skills in the acceleration-deceleration scene, wherein the acceleration-deceleration scene evaluation unit evaluates the driving skills in the acceleration-deceleration scene on a basis of a ratio of an acceleration vector value having the longitudinal acceleration and the lateral acceleration as components relative to a maximum value of the acceleration vector in the acceleration-deceleration scene, or a ratio of a jerk vector value having longitudinal jerk and lateral jerk as components relative to a maximum value of the jerk vector in the acceleration-deceleration scene.

11. The driving evaluation system according to claim 1, further comprising:

an in-acceleration and in-deceleration data acquisition unit that is configured to acquire in-acceleration and in-deceleration data including time series data of longitudinal acceleration and lateral acceleration in an acceleration-deceleration scene; and an acceleration-deceleration scene evaluation unit that evaluates driving skills in the acceleration-deceleration scene, wherein the acceleration-deceleration scene evaluation unit evaluates the driving skills in the acceleration-deceleration scene on a basis of a ratio of an acceleration vector value having the longitudinal acceleration and the lateral acceleration as components relative to a maximum value of the acceleration vector in the acceleration-deceleration scene, or a ratio of a jerk vector value having longitudinal jerk and lateral jerk as components relative to a maximum value of the jerk vector in the acceleration-deceleration scene.

12. The driving evaluation system according to claim 2, further comprising:

an in-acceleration and in-deceleration data acquisition unit that is configured to acquire in-acceleration and in-deceleration data including time series data of longitudinal acceleration and lateral acceleration in an acceleration-deceleration scene; and an acceleration-deceleration scene evaluation unit that evaluates driving skills in the acceleration-deceleration scene, wherein the acceleration-deceleration scene evaluation unit evaluates the driving skills in the acceleration-deceleration scene on a basis of a ratio of an acceleration vector value having the longitudinal acceleration and the lateral acceleration as components relative to a maximum value of the acceleration vector in the acceleration-deceleration scene, or a ratio of a jerk vector value having longitudinal jerk and lateral jerk as components relative to a maximum value of the jerk vector in the acceleration-deceleration scene.

13. The driving evaluation system according to claim 3, further comprising:

an in-acceleration and in-deceleration data acquisition unit that is configured to acquire in-acceleration and in-deceleration data including time series data of longitudinal acceleration and lateral acceleration in an acceleration-deceleration scene; and an acceleration-deceleration scene evaluation unit that evaluates driving skills in the acceleration-deceleration scene, wherein the acceleration-deceleration scene evaluation unit evaluates the driving skills in the acceleration-deceleration scene on a basis of a ratio of an acceleration vector value having the longitudinal acceleration and the lateral acceleration as components relative to a maximum value of the acceleration vector in the acceleration-deceleration scene, or a ratio of a jerk vector value having longitudinal jerk and lateral jerk as components relative to a maximum value of the jerk vector in the acceleration-deceleration scene.

14. The driving evaluation system according to claim 6, further comprising:

an in-acceleration and in-deceleration data acquisition unit that is configured to acquire in-acceleration and in-deceleration data including time series data of longitudinal acceleration and lateral acceleration in an acceleration-deceleration scene; and an acceleration-deceleration scene evaluation unit that evaluates driving skills in the acceleration-deceleration scene, wherein the acceleration-deceleration scene evaluation unit evaluates the driving skills in the acceleration-deceleration scene on a basis of a ratio of an acceleration vector value having the longitudinal acceleration and the lateral acceleration as components relative to a maximum value of the acceleration vector in the acceleration-deceleration scene, or a ratio of a jerk vector value having longitudinal jerk and lateral jerk as components relative to a maximum value of the jerk vector in the acceleration-deceleration scene.

15. The driving evaluation system according to claim 9, further comprising:

an in-acceleration and in-deceleration data acquisition unit that is configured to acquire in-acceleration and in-deceleration data including time series data of longitudinal acceleration and lateral acceleration in an acceleration-deceleration scene; and an acceleration-deceleration scene evaluation unit that evaluates driving skills in the acceleration-deceleration scene, wherein the acceleration-deceleration scene evaluation unit evaluates the driving skills in the acceleration-deceleration scene on a basis of a ratio of an acceleration vector value having the longitudinal acceleration and the lateral acceleration as components relative to a maximum value of the acceleration vector in the acceleration-deceleration scene, or a ratio of a jerk vector value having longitudinal jerk and lateral jerk as components relative to a maximum value of the jerk vector in the acceleration-deceleration scene.

16. A driving evaluation method performed by a driving evaluation system, the system comprising:

an in-turn data acquisition unit configured to acquire in-turn data including time series data of longitudinal acceleration and lateral acceleration in a turning scene; and a turning scene evaluation unit configured to evaluate driving skills in the turning scene on a basis of a shape of a trajectory of time series data from a starting point at which the longitudinal acceleration becomes a maximum to an ending point at which an absolute value of the lateral acceleration becomes a maximum, among the in-turn data in a case in which the longitudinal acceleration upon deceleration is positive, wherein the method comprising the steps of:

acquiring in-turn data including time series data of longitudinal acceleration and lateral acceleration in a turning scene by way of the in-turn data acquisition unit; and evaluating, by way of the turning scene evaluation unit, driving skills in the turning scene on a basis of a shape of a trajectory of time series data from a starting point at which the longitudinal acceleration becomes a maximum to an ending point at which an absolute value of the lateral acceleration becomes a maximum, among the in-turn data, in a case in which the longitudinal acceleration upon deceleration is positive.

17. A program for causing a computer to execute each step of the driving evaluation method according to claim 16.

18. A medium encoded with the program according to claim 17.

* * * * *